United States Patent
Swaminathan et al.

(10) Patent No.: US 9,370,043 B2
(45) Date of Patent: Jun. 14, 2016

(54) VOICE/DATA HYBRID MODE

(71) Applicant: QUALCOMM Incorporated, San Diego, CA (US)

(72) Inventors: Arvind Swaminathan, San Diego, CA (US); Srinivasan Balasubramanian, San Diego, CA (US); Thomas Klingenbrunn, San Diego, CA (US); Shyamal Ramachandran, San Diego, CA (US); Amit Mahajan, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 162 days.

(21) Appl. No.: 13/756,133

(22) Filed: Jan. 31, 2013

(65) Prior Publication Data

US 2013/0201850 A1 Aug. 8, 2013

Related U.S. Application Data

(60) Provisional application No. 61/594,998, filed on Feb. 3, 2012.

(51) Int. Cl.
*H04W 88/06* (2009.01)
*H04W 72/12* (2009.01)
*H04W 56/00* (2009.01)

(52) U.S. Cl.
CPC .......... *H04W 88/06* (2013.01); *H04W 72/1215* (2013.01); *H04W 56/00* (2013.01); *H04W 72/1242* (2013.01)

(58) Field of Classification Search
None
See application file for complete search history.

(56) References Cited

U.S. PATENT DOCUMENTS

| 7,133,646 B1* | 11/2006 | Miao | H04B 1/38 455/552.1 |
| 8,073,436 B2* | 12/2011 | Yaqub | H04W 76/048 370/311 |
| 2007/0047491 A1* | 3/2007 | Dutta | H04W 36/32 370/331 |
| 2007/0099614 A1 | 5/2007 | Parekh et al. | |
| 2008/0020769 A1 | 1/2008 | Parekh et al. | |
| 2008/0214198 A1* | 9/2008 | Chen et al. | 455/450 |
| 2009/0239533 A1* | 9/2009 | Somasundaram et al. | 455/434 |

(Continued)

FOREIGN PATENT DOCUMENTS

EP 1467584 A1 10/2004
EP 2107732 A1 10/2009

(Continued)

OTHER PUBLICATIONS

Partial International Search Report—PCT/US2013/024345—ISA/EPO—May 7, 2013.

(Continued)

*Primary Examiner* — Faruk Hamza
*Assistant Examiner* — Cassandra Decker
(74) *Attorney, Agent, or Firm* — Seyfarth Shaw LLP

(57) ABSTRACT

A method for voice/data hybrid mode within a user equipment (UE). The method includes detecting a first radio access technology (RAT) activity in response to a received first RAT suspend request for a second RAT tune-away. The method also includes adaptively performing the first RAT suspend request according to a predetermined priority of the detected first RAT activity and a second RAT tune-away activity. A receive chain is shared between a first RAT modem and a second RAT modem of the UE.

18 Claims, 9 Drawing Sheets

(56) References Cited

U.S. PATENT DOCUMENTS

| | | |
|---|---|---|
| 2010/0034126 A1 | 2/2010 | Kitazoe et al. |
| 2010/0240420 A1* | 9/2010 | Chin et al. .................... 455/574 |
| 2010/0261487 A1* | 10/2010 | Razdan ........................ 455/458 |
| 2010/0284333 A1 | 11/2010 | Shirota et al. |
| 2011/0096857 A1* | 4/2011 | Koo et al. .................... 375/260 |
| 2011/0103305 A1 | 5/2011 | Ali et al. |
| 2011/0207491 A1 | 8/2011 | Swaminathan |
| 2011/0312347 A1 | 12/2011 | Dinan |
| 2011/0317635 A1* | 12/2011 | Swaminathan ............... 370/329 |
| 2012/0021734 A1* | 1/2012 | Shi ........................ H04W 48/16 455/422.1 |
| 2012/0033554 A1* | 2/2012 | Shiva et al. .................. 370/235 |
| 2012/0134449 A1 | 5/2012 | Chen et al. |
| 2012/0190362 A1 | 7/2012 | Subbarayudu et al. |
| 2012/0275380 A1* | 11/2012 | Chin et al. .................... 370/328 |
| 2012/0294173 A1* | 11/2012 | Su et al. ........................ 370/252 |
| 2013/0044616 A1* | 2/2013 | Scholand et al. ............. 370/252 |
| 2013/0053076 A1* | 2/2013 | Chang et al. ................. 455/509 |
| 2013/0172023 A1* | 7/2013 | Chan et al. ................... 455/466 |

FOREIGN PATENT DOCUMENTS

| | | |
|---|---|---|
| WO | 2005101887 A1 | 10/2005 |
| WO | 2011056254 | 5/2011 |
| WO | WO 2011056254 A1 * | 5/2011 |

OTHER PUBLICATIONS

International Search Report and Written Opinion—PCT/US2013/024345—ISA/EPO—Jun. 18, 2013.

* cited by examiner

VOICE/DATA HYBRID MODE

CROSS-REFERENCE TO RELATED APPLICATIONS

The present application claims the benefit of U.S. Provisional Patent Application No. 61/594,998 filed on Feb. 3, 2012, in the names of A. Swaminathan et al., the disclosures of which is expressly incorporated by reference herein in its entirety.

BACKGROUND

1. Field

Aspects of the present disclosure relate generally to wireless communication systems, and more particularly to voice/data hybrid mode within a user equipment (UE).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies are adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP).

LTE technology is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. As the demand for mobile broadband access continues to increase, however, there exists a need for further improvements in LTE technology. Preferably, these improvements should be applicable to other multi-access technologies and the telecommunication standards that employ these technologies. Research and development continue to advance LTE technology not only to meet the growing demand for mobile broadband access, but to advance and enhance the user experience with mobile communications.

SUMMARY

According to one aspect of the present disclosure, a method for a voice/data hybrid mode within a user equipment (UE) is described. The method includes detecting a first radio access technology (RAT) activity in response to a received first RAT suspend request for a second RAT tune-away. The method also includes adaptively performing the first RAT suspend request according to a predetermined priority of the detected first RAT activity and a second RAT tune-away activity. A receive chain is shared between a first RAT modem and a second RAT modem of the UE.

In another aspect, an apparatus for a voice/data hybrid mode within a UE is described. The apparatus includes at least one processor; and a memory coupled to the at least one processor. The processor(s) is configured to detect a first radio access technology (RAT) activity in response to a received first RAT suspend request for a second RAT tune-away. The processor(s) is also configured to adaptively perform the first RAT suspend request according to a predetermined priority of the detected first RAT activity and a second RAT tune-away activity. A receive chain is shared between a first RAT modem and a second RAT modem of the UE.

In a further aspect, a computer program product for a voice/data hybrid mode within a UE is described. The computer program product includes a non-transitory computer-readable medium having program code recorded thereon. The computer program product has program code to detect a first radio access technology (RAT) activity in response to a received first RAT suspend request for a second RAT tune-away. The computer program product also has program code to adaptively perform the first RAT suspend request according to a predetermined priority of the detected first RAT activity and a second RAT tune-away activity. A receive chain is shared between a first RAT modem and a second RAT modem of the UE.

In another aspect, an apparatus for a voice/data hybrid mode within a UE is described. The apparatus includes means for detecting a first radio access technology (RAT) activity in response to a received first RAT suspend request for a second RAT tune-away. The apparatus further includes means for adaptively performing the first RAT suspend request according to a predetermined priority of the detected first RAT activity and a second RAT tune-away activity. A receive chain is shared between a first RAT modem and a second RAT modem of the UE.

According to a further aspect of the present disclosure, a method for a voice/data hybrid mode within a UE is described. The method includes adaptively performing a first radio access technology (RAT) scan between a second radio access technology (RAT) activity in response to an out of service (OoS) event. A receive chain is shared between a first RAT modem and a second RAT modem of the UE.

In another aspect, an apparatus for a voice/data hybrid mode within a UE is described. The apparatus includes at least one processor; and a memory coupled to the at least one processor. The processor(s) is configured to adaptively perform a first radio access technology (RAT) scan between a second radio access technology (RAT) activity in response to an out of service (OoS) event. A receive chain is shared between a first RAT modem and a second RAT modem of the UE.

In a further aspect, a computer program product for 1x/LTE dual domain camping with a single radio UE is described. The computer program product includes a non-transitory computer-readable medium having program code recorded thereon. The computer program product has program code to adaptively perform a first radio access technology (RAT) scan between a second radio access technology (RAT) activity in response to an out of service (OoS) event. A receive chain is shared between a first RAT modem and a second RAT modem of the UE.

In another aspect, an apparatus for 1x/LTE dual domain camping with a single radio UE is described. The apparatus includes means for adaptively performing a first radio access technology (RAT) scan between a second radio access technology (RAT) activity in response to an out of service (OoS)

event. A receive chain is shared between a first RAT modem and a second RAT modem of the UE.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
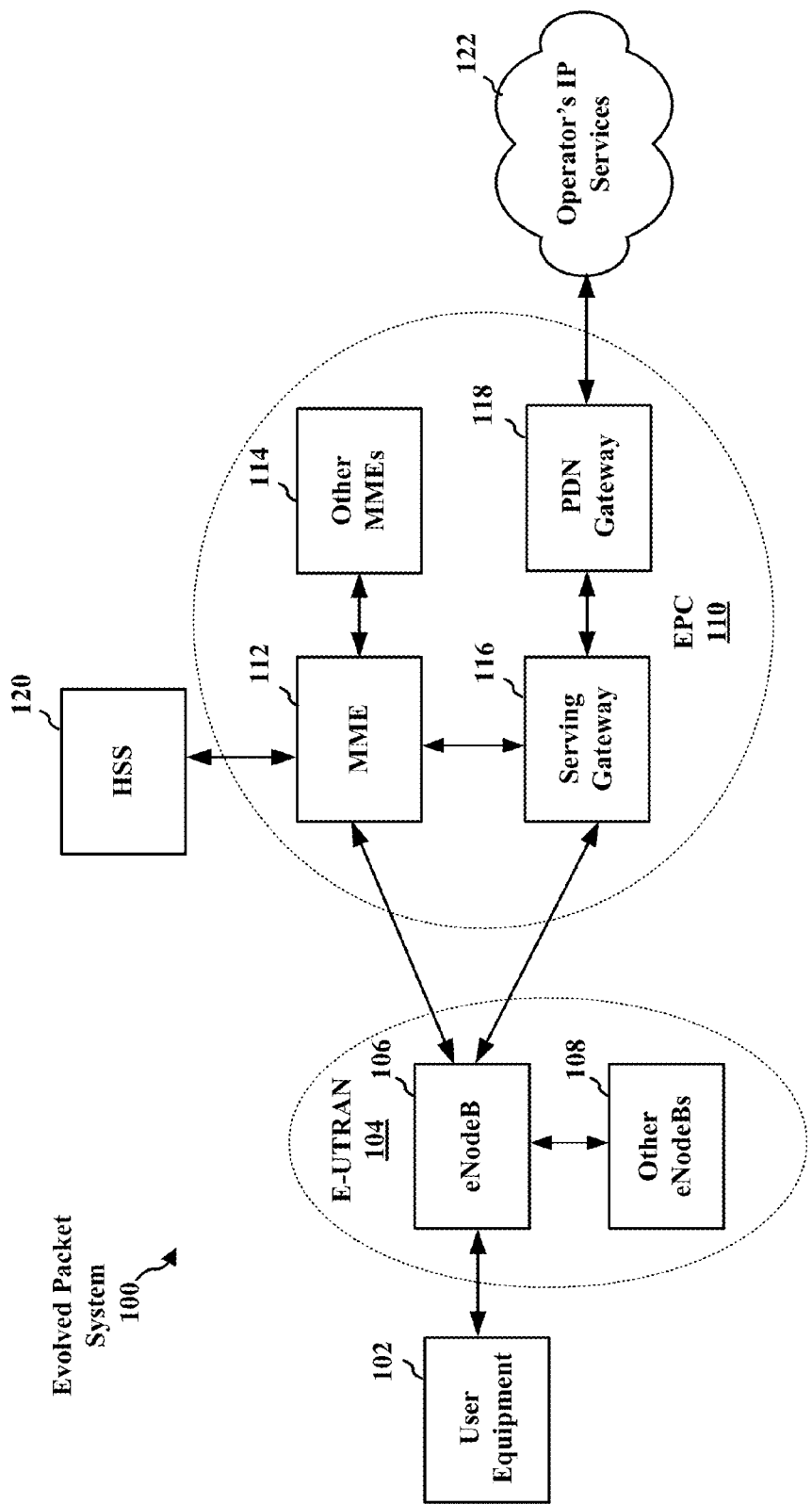
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100, which may be an LTE/-A network, in which a voice/data hybrid mode with a UE may be performed, according to one aspect of the present disclosure. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
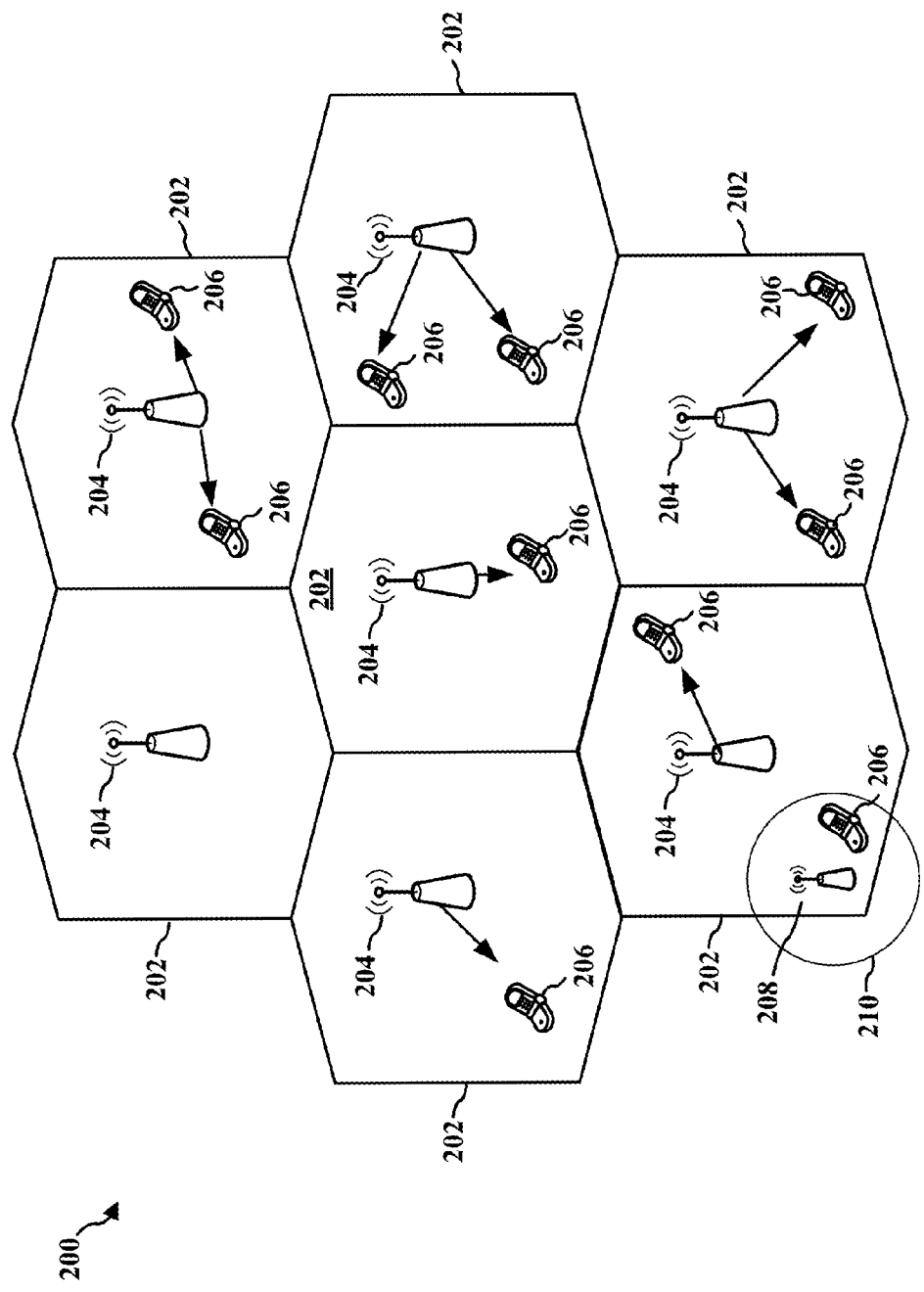
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
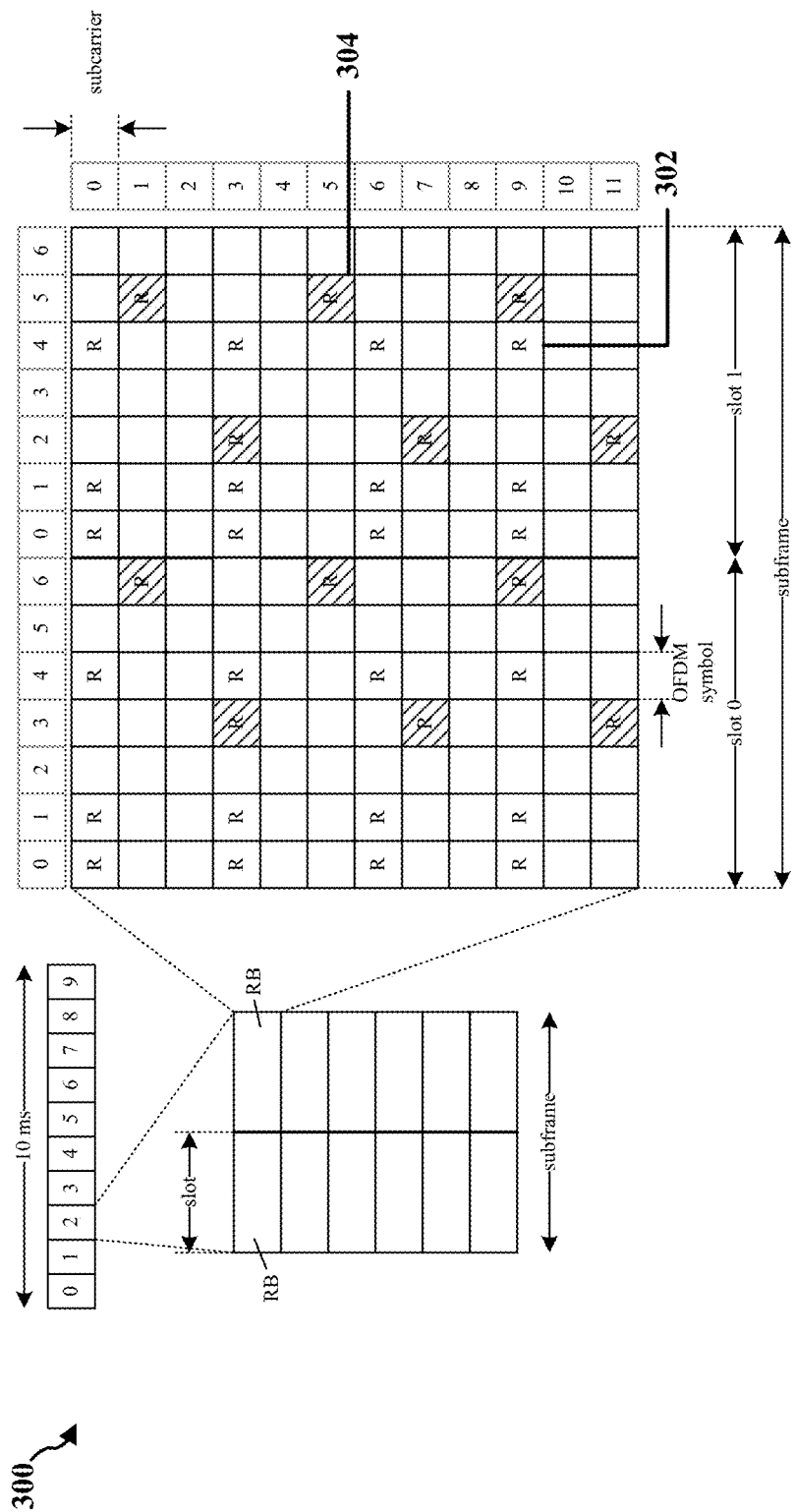
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
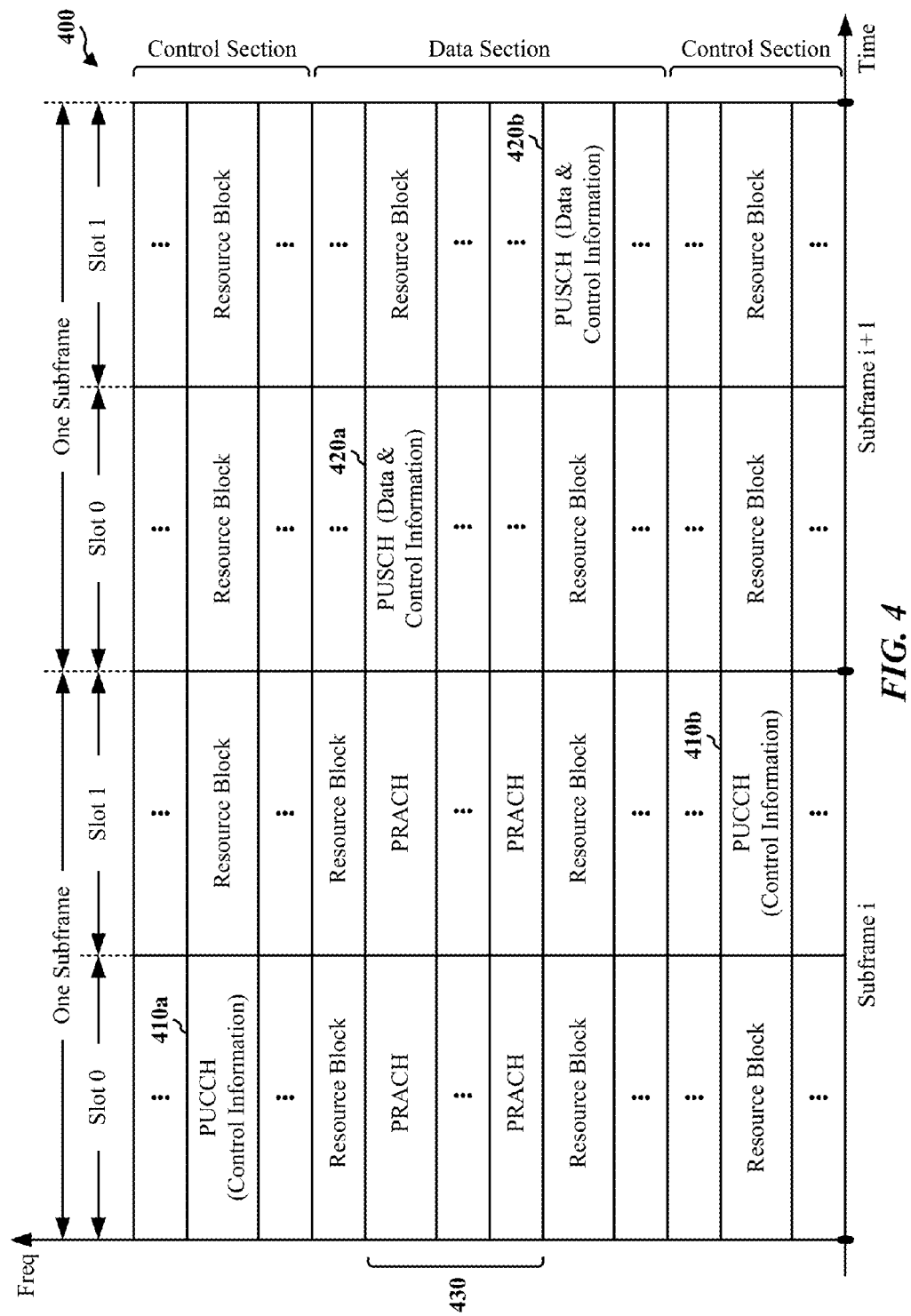
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
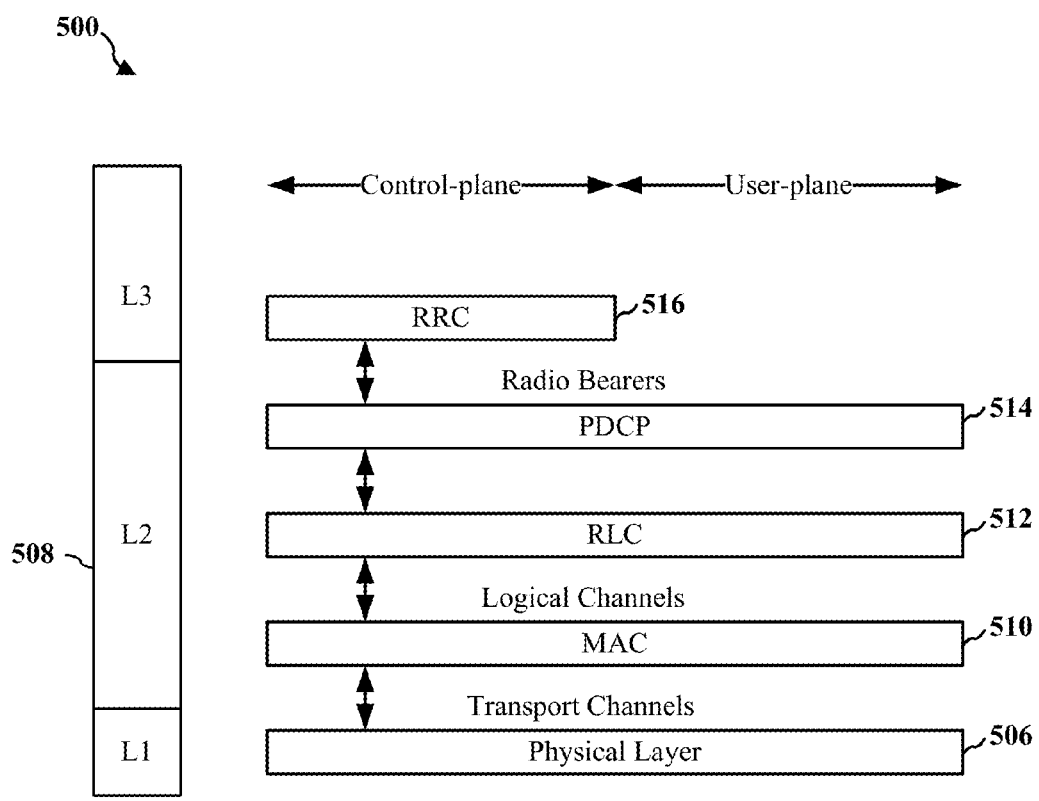
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
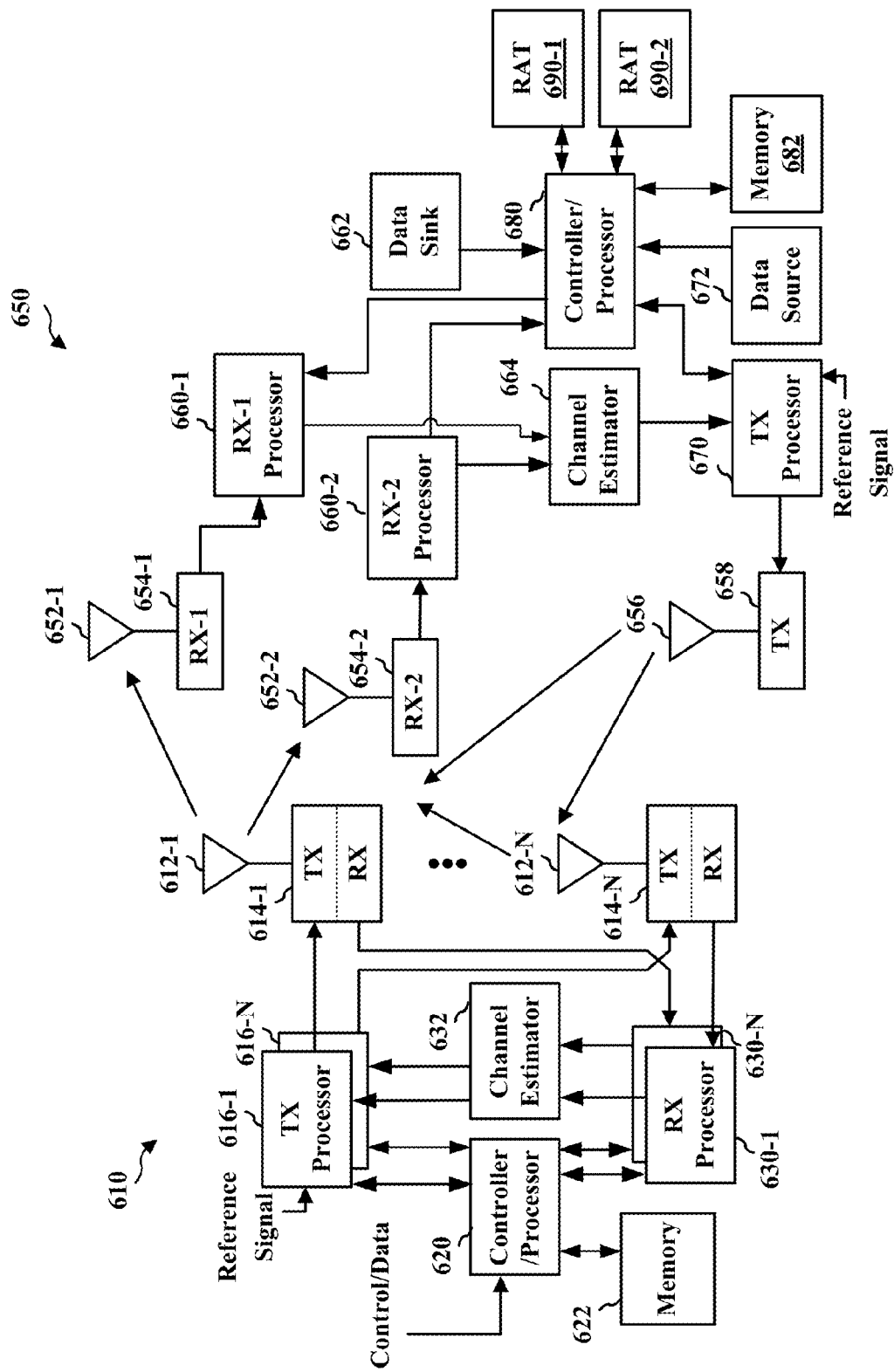
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 620. The controller/processor 620 implements the functionality of the L2 layer. In the downlink, the controller/processor 620 provides header compression, ciphering, packet segmentation and reordering, multiplexing between logical and transport channels, and radio resource allocations to the UE 650 based on various priority metrics. The controller/processor 620 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 632 may be used to determine the coding and modulation scheme, as well as for spatial processing. The channel estimate may be derived from a reference signal and/or channel condition feedback transmitted by the UE 650. Each spatial stream is then provided to a different antenna 612 (612-1, 612-N) via separate transmitters 614 TX (614-1, . . . , 614-N). Each of the transmitters 614 TX modulates an RF carrier with a respective spatial stream for transmission.

At the UE 650, a first receiver 654-1 RX-1 receives a signal through a first antenna 652-1, and a second receiver 654-2 RX-2 receives a signal through a second antenna 652-2. The first receiver 654-1 RX-1 recovers information modulated onto an RF carrier and provides the information to a first receiver (RX-1) processor 660-1. The second receiver 654-2 RX-2 also recovers information modulated onto an RF carrier and provides the information to a second receiver (RX-2) processor 660-2. The first RX-1 processor 660-1 and the second RX-2 processor 660-2 implement various signal processing functions of the L1 layer. The first RX-1 processor 660-1 and the second RX-2 processor 660-2 perform spatial processing on the information to recover any spatial streams destined for the UE 650. If multiple spatial streams are destined for the UE 650, they may be combined by the first RX-1 processor 660-1 and the second RX-2 processor 660-2 into single OFDM symbol streams. The RX-1 processor 660-1 and the second RX-2 processor 660-2 may then convert the OFDM symbol streams from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNodeB 610. These soft decisions may be based on channel estimates computed by the channel estimator 664. The soft decisions are then decoded and de-interleaved to recover the data and control signals that were originally transmitted by the eNodeB 610 on the physical channel. The data and control signals are then provided to the controller/processor 680.

The controller/processor 680 implements the L2 layer. The controller/processor can be associated with a memory 682 that stores program codes and data. The memory 682 may be referred to as a computer-readable medium. In the uplink, the controller/processor 680 provides de-multiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 680 is also responsible for error detection using an acknowledgement (ACK) and/or negative acknowledgement (NACK) protocol to support HARQ operations.

In the uplink, a data source 672 is used to provide upper layer packets to the controller/processor 680. The data source 672 represents all protocol layers above the L2 layer. Similar to the functionality described in connection with the downlink transmission by the eNodeB 610, the controller/processor 680 implements the L2 layer for the user plane and the control plane by providing header compression, ciphering, packet segmentation and reordering, and multiplexing between logical and transport channels based on radio resource allocations by the eNodeB 610. The controller/processor 680 is also responsible for HARQ operations, retransmission of lost packets, and signaling to the eNodeB 610.

Channel estimates derived by a channel estimator 664 from a reference signal or feedback transmitted by the eNodeB 610 may be used by the TX processor 670 to select the appropriate coding and modulation schemes, and to facilitate spatial processing. The spatial streams generated by the TX processor 670 are provided to an antenna 656 via a transmitter 658 TX. The transmitter 658 TX modulates an RF carrier with a respective spatial stream for transmission.

The uplink transmission is processed at the eNodeB 610 in a manner similar to that described in connection with the receiver function at the UE 650. Each of the receivers 614 RX (614-1, . . . , 614-N) receives a signal through its respective antenna 612 (612-1, . . . , 612-N). Each of the receivers 614 RX recovers information modulated onto an RF carrier and provides the information to one of the RX processors 630 (630-1, . . . , 630-N). The RX processors 630 may implement the L1 layer.

The controller/processor 620 implements the L2 layer. The controller/processor 620 can be associated with a memory 622 that stores program codes and data. The memory 622 may be referred to as a computer-readable medium. In the uplink, the controller/processor 620 provides demultiplexing between transport and logical channels, packet reassembly, deciphering, header decompression, control signal processing to recover upper layer packets from the UE 650. Upper layer packets from the controller/processor 620 may be provided to the core network. The controller/processor 620 is also responsible for error detection using an ACK and/or NACK protocol to support HARQ operations The controller/processor 620 and the controller/processor 680 may direct the operation at the eNodeB 610 and the UE 650, respectively. The controller/processor 620 and/or other processors and modules at the eNodeB 610 may perform or direct the execution of various processes for the techniques described herein. The controller/processor 680 and/or other processors and modules at the UE 650 may also perform or direct the execution of the functional blocks illustrated in use in the method flow charts of FIGS. 7 and 8 and/or other processes for the techniques described involving a voice/data hybrid mode within the UE 650. In this configuration, the UE 650 includes a first radio access technology (RAT) 690-1 and a second RAT 690-2 that share a single receive path to provide the voice/data hybrid mode. The memory 622 and the memory 682 may store data and program codes for the eNodeB 610 and the UE 650, respectively.

Voice/Data Hybrid Mode within a Radio UE

One aspect of the present disclosure provides a UE that receives data over a first radio access technology (RAT) and voice over a second radio access technology (RAT) while supporting a single receive path. In this aspect of the disclosure, a first receive chain and a second receive chain of the single receive path are shared between a first radio access technology (RAT) modem and a second RAT modem. In one configuration, the first RAT modem is an LTE modem and the second RAT is a 1x (CDMA2000) modem.

CDMA2000 includes but is not limited to single carrier radio transmission technology (1xRTT), 1x evolution-data optimized (1xEV-DO), and other like mobile technology standards that use CDMA channel access for sending voice, data, and signaling data between mobile phones and cell sites. As described herein CDMA2000 may be referred to as 1x. Other configurations of the first and second RAT modems are possible while remaining within the scope of the appended claims and the inventive aspects of the present disclosure. For example the first and second RAT modems could be for HSPA and GSM or any other network. The following description is provided with respect to 1x and LTE for ease of illustration.

Simultaneous voice and LTE (SVLTE) is the current de facto standard for voice delivery when LTE is an overlay to a CDMA2000 (1x) network. In SVLTE communication, voice service is deployed as a 1x service that runs in parallel with LTE data services. As a result, a handset runs two radios simultaneously to implement SVLTE communication. Several voice solutions are available to C2K (CDMA2000) operators that are planning on releasing a multimode LTE/C2K handset. These include options that involve network support and/or upgrades including: (1) voice over IP over LTE (VoLTE) and (2) 1x Circuit Switched Fallback (1xCSFB); and options that specify reduced or no network support including: (1) dual receiver 1xCSFB and (2) SVLTE.

The assumption behind options that do not involve network support is that the device either supports dual receive paths or dual receive/dual transmit paths. It should be noted that dual receive paths in an LTE UE implies three receive chains for supporting MIMO (multiple input multiple output) operation in LTE. Dual receive paths enable a UE to independently monitor LTE paging and 1x paging, as specified for supporting dual receiver CSFB communication. Dual receive/dual transmit paths enable a UE to support independent 1x and LTE operation, as specified for supporting SVLTE communication.

One aspect of the present disclosure provides a UE that receives data over LTE and voice over 1x while supporting a single receive path. In this aspect of the disclosure, a UE provides a voice/data hybrid mode in which a single receive path that includes a first receive chain and a second receive chain is shared between a first radio access technology (RAT) modem and a second RAT modem. In one configuration, the single receive path implies two receive chains for supporting MIMO operation in LTE.

Figure 7:
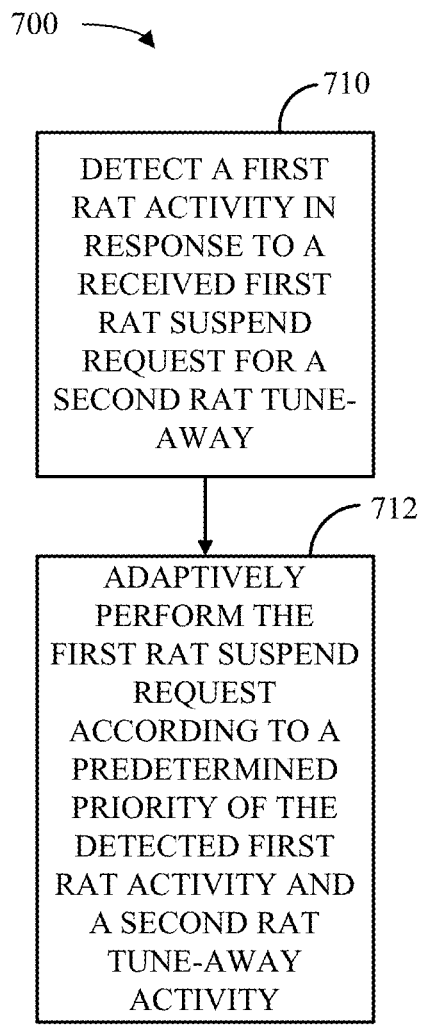
FIG. 7 is a block diagram illustrating a method for a voice/data hybrid mode within a UE according to an aspect of the present disclosure.

FIG. 7 illustrates a method 700 for a voice/data (e.g., 1x/LTE) hybrid mode operation according to an aspect of the present disclosure. In one aspect of the present disclosure, a primary (first) receive chain and a diversity (second) receive chain are shared between an LTE modem and a 1x modem of a UE. For example, as shown in FIG. 6, the UE 650 includes a first RAT 690-1 (e.g., an LTE modem) and a second RAT 690-2 (e.g., a 1x modem) that share a single receive path. In this configuration, a first receiver 654-1 RX-1 has a first antenna 652-1 and a second receiver 654-2 RX-2 has a second antenna 652-2 that are shared between the first RAT 690-1 and the second RAT 690-2 of the UE 650.

In one configuration, the sharing of the primary (e.g., the first receiver 654-1 RX-1, the first antenna 652-1, and the first RX-1 processor 660-1) and diversity (second receiver 654-2 RX-2, the second antenna 652-1, and the second RX-2 processor 660-2) receive chains of the UE 650 prohibits camping on both an LTE network and a 1x network. As a result, 1x pages and LTE pages may collide during operation of the UE 650. A tune-away from LTE to listen for 1x pages or perform other like 1x activity is referred to as a "1x tune-away." The 1x tune-away results from sharing of the primary and diversity receive chains to provide a voice/data hybrid mode. In this configuration, the first RAT 690-1 and the second RAT 690-2 adaptively share the primary and diversity receive chains to enable reception of LTE data and 1x voice calls.

The 1x tune-away from LTE is performed in response to an LTE suspend request to listen for 1x pages or other like 1x activity. The 1x tune-away results from the received LTE suspend request. Conventional approaches tune-away from LTE in response to LTE suspend requests regardless of the activity taking place on LTE, which may be referred to as "LTE activity." In contrast to the conventional approach, a received LTE suspend request may or may not be performed depending on the priority of the current LTE activity and a 1x tune-away activity.

One aspect of the disclosure supports a framework in which LTE suspend requests are adaptively honored for 1x tune-away. For instance, because interrupting the following LTE activities could lead to catastrophic consequences on LTE, the UE may choose to ignore the LTE suspend request and not honor the 1x tune-away if the UE is in the middle of a predetermined LTE activity including, but not limited to: (1) an LTE attach; (2) an inter-eNB/inter-RAT HO (radio access technology handover); (3) security procedures; (4) a TAU (tracking area update); and (5) device provisioning or software updates triggered by the network. Repeated breaks may result in an inconsistent state between the network and the UE. In addition, breaking away from LTE when the following events are about to occur could lead to Global Certification Forum (GCF) test violations: (1) UE is in the middle of a Request-Response messages in NAS/RRC (non-access stratum/radio resource control) specification; or (2) a timer at which the UE is expected to retry an activity is about to expire.

Referring again to FIG. 7, the method 700 for adaptively honoring LTE suspend requests for 1x tune-away is described. In block 710, a first radio access technology (RAT) activity is detected in response to a received first RAT suspend request for a second RAT tune-away. For example, during operation of a UE 650, the UE 650 detects an LTE activity in response to a received LTE suspend request for a 1x tune-away activity. In block 712, the UE adaptively performs the first RAT suspend request according to a predetermined priority of the detected first RAT activity and the second RAT tune-away activity. In this configuration, the first receive chain and the second receive chain are shared between the LTE modem and the 1x modem of the UE 650.

For example, the UE 650 adaptively performs the LTE suspend request according to a predetermined priority of the detected LTE activity and a 1x tune-away. A 1x tune-way for a mobile or UE terminated activity (e.g., incoming activity) may be awarded priority over the detected LTE activity. Conversely, the detected LTE activity may be awarded priority over a mobile or UE originated activity (e.g., an outgoing activity). In this configuration, the LTE suspend request is received to enable a 1x tune-away.

That is, the UE may distinguish between a LTE suspend request for a mobile originated 1x activity versus a LTE suspend request for mobile terminated page reception. If the suspend request is for mobile originated activity, then the UE can take a longer time to respond to the suspend request if it is in the middle of an important LTE activity. On the other hand, the UE will be more stringent about delaying a suspend request for a mobile terminated page reception.

This aspect of the disclosure adaptively honors LTE suspend requests according to the importance of the LTE activity, such that predetermined LTE activities take priority over a 1x tune-away. For example, delaying a mobile originated activity by a few seconds slightly degrades the user experience. In this aspect of the disclosure, the LTE suspend request indicates whether the request is for a mobile originated or a mobile terminated (MT) activity. For a mobile originated activity, delaying the honoring of an LTE suspend request is more likely so that the LTE activity may complete. Conversely, for mobile terminated activities, the LTE suspend request is delayed only for the higher priority LTE activities.

One configuration of the voice/data hybrid mode enables a single receive chain in an LTE connected mode while performing 1x paging requests. In particular, rather than suspending LTE to enable performance of the 1x paging requests, the UE 650 may temporarily operate as a single output device. That is, the UE 650 informs the network that it is temporarily operating as a single output device, such that the UE has access to a single receive chain. As a result, the UE 650 operates at a reduced rate without completely shutting down LTE, while being able to perform the 1x paging requests. For example, during an LTE traffic mode, the UE 650 reduces a rank to one (1), thereby allowing an LTE call (with a single receive chain) simultaneous with 1x page monitoring (using the other receive chain).

Figure 8:
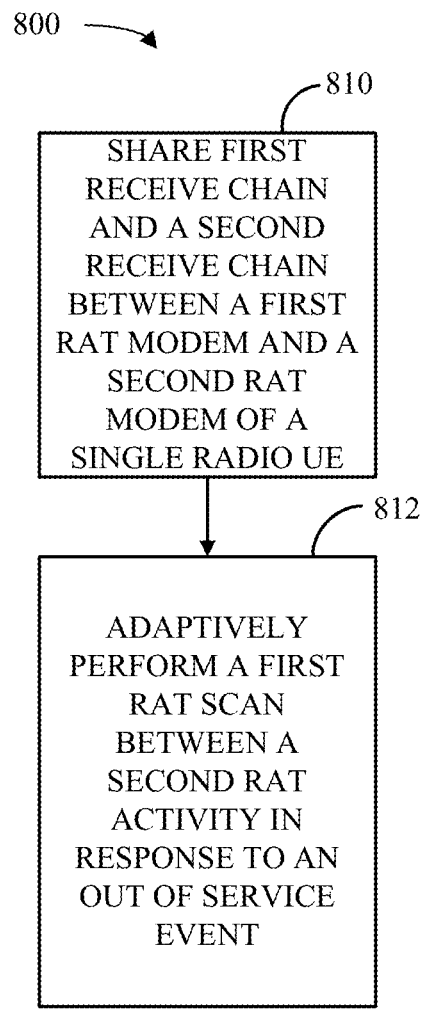
FIG. 8 is a block diagram illustrating a method for a voice/data hybrid mode within a UE using adaptive scanning according to an aspect of the present disclosure.

FIG. 8 illustrates a method 800 for voice/data hybrid mode within a UE 650 according to an aspect of the present disclosure. This aspect of the disclosure modifies the behavior of 1x out-of-service (OoS) behavior by executing full scans repeatedly, while accounting for back-offs. The current behavior is to scan for available 1x systems for 15 minutes continuously with a subsequent telescopic backoff for scans. Similarly, the system selection scans prevent situations where the LTE system acquisition (during RLF (radio link failure), OoS scan, etc.) does not interfere with a 1x paging wakeup.

At block 810, a first receive chain and a second receive chain are shared between a first RAT modem and a second RAT modem of a UE. At block 812, a first radio access technology (RAT) scan is adaptively performed between a second radio access technology (RAT) activity in response to an out of service (OoS) event. In this aspect of the disclosure, 1x scans are adaptively performed in between LTE activity when 1x is out of coverage. Similarly, LTE system acquisition is performed in an adaptive manner for managing interference with 1x paging wakeup events or other like 1x tune-away activity when LTE is out of coverage.

An issue that arises due to the receive path limitation of the UE 650 when providing a voice/data hybrid mode is the complexity in dealing with the cases in which 1x and LTE page cycles overlap. That is, 1x paging occasions can collide with LTE paging occasions. Preferred cycle negotiation may be used to overcome such problems when the LTE and 1x networks are synchronized. Otherwise, if the arrival of a suspend trigger to read a 1x page can be anticipated, the UE 650, either prior to receiving the suspend trigger, or after receiving the trigger but prior to suspension, may signal to the network that it desires to increase the LTE paging cycle duration. Doing so decreases the probability of collision of multiple LTE page durations with the duration of LTE suspension.

The UE 650 could also use the network signaling to either request an increase in the paging cycle, or use the network signaling to explicitly request a precise paging cycle value. For example, upon determining that suspension for a 1x page reception has ended, or is not likely to arrive again soon, the UE 650 may signal to the network that it desires to reduce its paging cycle duration to enable receipt of pages in an expedited fashion. In other words, if a collision is expected, the UE 650 may request that the LTE network change a duration of the paging cycle.

In operation, an LTE suspend to read a 1x page may be overruled by a higher priority procedure on LTE. As a result, a page would be missed, in which case the network will re-page the UE. The paging cycle modification is performed to at least avoid a miss of the re-page from the network. In this configuration, after a suspend to read a 1x page is overruled, it should be ensured that on the next paging occasion, reading of the 1x page takes absolute priority. In other words, at a device level, to ensure the probability of missing two consecutive pages is low, such that the impact of collisions is reduced, in this configuration, the priority is reversed so that two consecutive paging requests are not missed.

The voice/data hybrid mode may enable a connection to both an LTE network and a CDMA2000 network, while maintaining registration and overhead information on both types of networks concurrently. The UE 650, however, does not have a signaling mechanism for communicating with the LTE network to indicate the honoring of an LTE suspension request to tune-away for responding to a 1x paging request.

A eNB scheduler may implement mechanisms to throttle back downlink assignments if a UE goes into a temporary outage when responding to a 1x paging request. During the outage, the eNB will not read the uplink LTE control channels carrying channel quality indicator (CQI) and/or ACK/NAK (acknowledgement/negative acknowledgement) information. For example, the scheduler may have a control loop that applies an offset to the CQI based scheduling determined by the history of ACK/NACKs received. If a number of subsequent NACKs are received (as would be the case during suspend), the scheduler would apply a negative offset (delta) to the CQI, and schedule the UE with smaller packet sizes than suggested by the UE reported CQI.

To remedy this, the UE could have a mechanism that compares the scheduled packet size with the expected packet size, in accordance with the reported CQI. If the actual packet size is much smaller than expected, the UE can apply a corresponding positive offset to the reported CQI. That is, the UE reports a CQI and the eNB schedules a data rate based on the CQI. Honoring of LTE suspend requests causes a large number of packet drops. Dropping the scheduling rate due to reduced CQI reporting also leads to packet loss. Therefore, the eNB gradually drops the data rate based on the dropped/lost packets. After the tune-away, the data rate is gradually increased, which leads to an insufficient data rate. In this aspect of the disclosure, after the return from the tune-away is complete and the data rate is not consistent with the CQIs, then the mobile device reports a CQI that is higher than what is actually experienced (e.g., CQI(x)+delta). As a result, the ramp-up of the data rate at the network occurs more quickly.

Further enhancements may include the application of a positive offset temporarily after the resume. In addition, the UE 650 may stop applying the offset as soon as a NACK is triggered. The UE 650 may also gradually ramp up the positive offset on ACK as well as gradually ramp the positive offset down on NACK. Further, the UE 650 may start ramping down the CQI leading up to the suspend.

In another aspect of the disclosure, when measurement scheduling collides with 1x operation, the measurement gap is either not scheduled or is aborted. Also, the measurement report is not reported to the network. Reporting of incorrect measurement reports to the network is avoided. That is, the periodic measurement may be incorrect because the UE may be tuned away for 1x tune-away activity.

In a further aspect of the disclosure, the UE ignores a RLC (radio link controller) reset in the uplink (UL) if the RLC is due to a tune-away. A higher priority may be awarded to LTE when approaching a maximum number of RLC resets. That is, if the maximum number of RLC resets is near, then the tune-away will not occur. In this aspect of the disclosure, RLC resets that are due to 1x tune-away are ignored so that the uplink connection is not released. That is, a 1x tune-away is not performed once the UE begins approaching the maximum RLC reset amount to avoid a loss of the LTE connection. Flow control applications may also be adjusted to accommodate for the 1× tune-away (e.g., for voice calls).

In another configuration, the voice/data hybrid mode supports QoS (quality of service) flow maintenance. Real-time activities that are QoS centric may result in disregarding a predetermined number of 1x tune-aways. If the UE detects a QoS call on LTE (e.g., a Skype call/VoLTE call), an option is provided to disable the 1x tune-away. If UE has voice through some other means with a separate RF chain (e.g., WiFi), the UE may stop monitoring 1x. If the UE has data through some other means with a separate RF chain (e.g., WiFi), the UE can suspend LTE operation.

In another configuration, the voice/data hybrid mode is adjusted to accommodate a short message service. For example, mobile originated short message service (SMS) messages may be re-routed over 1x during the voice call, and over IMS (i.e., SMS over a data network) when the UE is not on a 1x voice call. During LTE suspension, it is anticipated that the UE will remain on 1x for a brief period, unless the UE is involved in a 1x circuit switched call. While the UE is tuned to 1x, and LTE is suspended, the UE maintains the IMS registration context over LTE. In this configuration, the UE uses IMS as the default SMS transport and attempts sending SMS messages over IMS. Nevertheless, when the mobile originated SMS message attempt over IMS fails after a stipulated amount of retries, the UE should check to see if the LTE stack is currently in suspension. If this is true, the UE should attempt to send the SMS messages over 1x, while continuing to maintain the IMS context over LTE.

The UE may support domain availability notification to help the network start routing SMS messages over 1x if reducing SMS interruption is important. Movement of the SMS domain over 1x may also result in having to perform IMS re-registration upon returning to LTE. This is designed based on inputs from the operator on their SMS sequential retry logic. In this configuration, when the UE tunes-away to LTE to receive pages, the SMS domain is maintained over IMS for a certain duration to prevent a change in the SMS domain during short outages.

In another aspect of the disclosure, applications are throttled during the transitions from LTE for 1x monitoring to enable the voice/data hybrid mode. Throttling of applications may cause buffer overflows at the application/HLOS (high level operating system). Application throttling may prevent technology change notifications from being posted to the application when the UE has transitioned to 1x for periodic monitoring and during voice calls. Application flow control may be performed to avoid indicating to the applications that a 1x tune-away is being performed for ensuring that an IP context is saved. Otherwise, the IP context is torn down by the application if communication of the 1x tune-away is not blocked from the application.

In a further aspect of the disclosure, the UE predicts when a suspend/tune-away is going to happen. During the predicted suspend/tune-away, the UE does not engage in activities on the LTE side that cannot be completed prior to the predicted suspend/tune-away. Based on the UE knowledge of a 1x tune-away, the 1x tune-away is rescheduled to avoid overlap with an LTE activity (e.g., an LTE tracking area update) that cannot be completed if the 1x tune-away is performed. The 1x tune-way is rescheduled to reduce the probability of overlap. In addition, the receive window for a TCP (transmission control protocol) may be collapsed during active data transitions to prevent TCP back-offs and unnecessary congestions in the network. For example, the transmit rate may be reduced or transmission may be halted during the 1x tune-away.

The voice/data hybrid mode may occasionally miss a 1x paging slot. In the event that a page is missed, this configuration relies on the retries from the 1x side. As indicated above, certain high priority LTE activities are awarded priority over 1x tune-aways. In this configuration, after a suspend to read a 1x page is overruled by a higher priority LTE activity, it should be ensured that on the next paging occasion, reading of the 1x page takes priority. To ensure that the probability of missing two consecutive pages is low, in this configuration, the priority is reversed (e.g., the 1x tune-away trumps the LTE priority) so that two consecutive paging requests are not missed.

Figure 9:
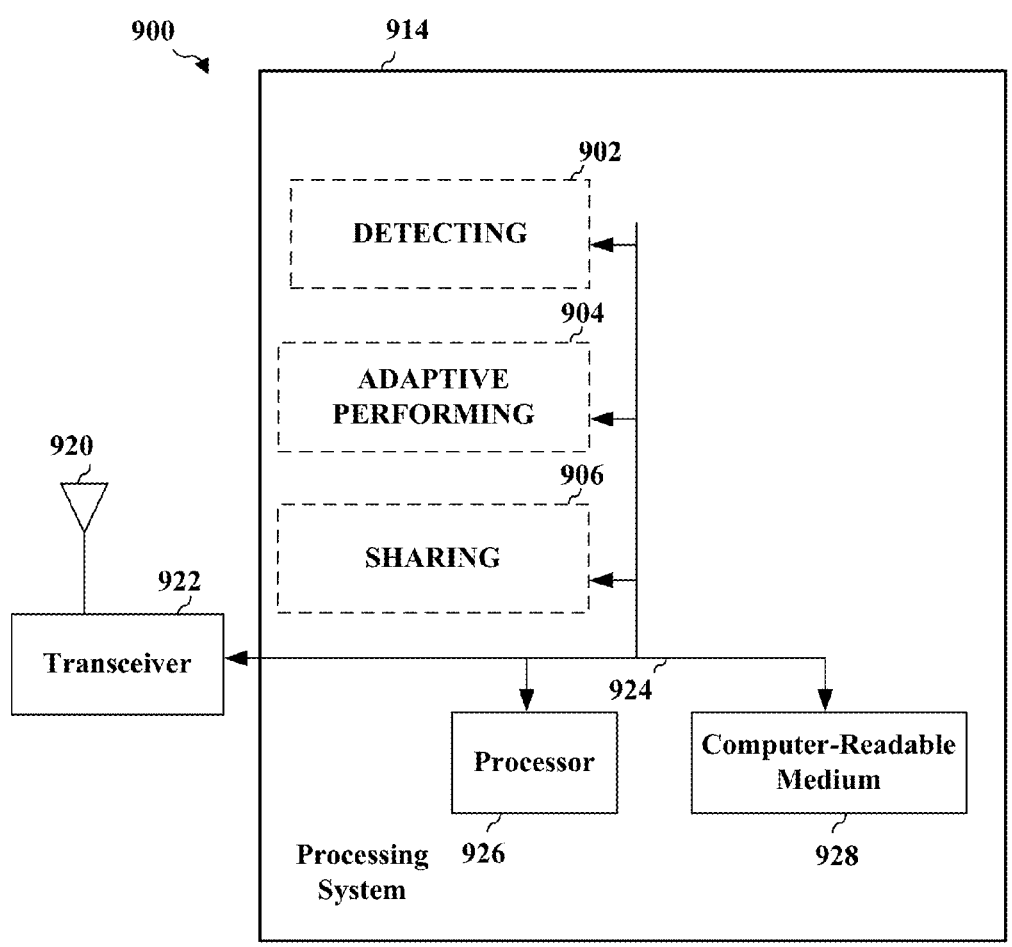
FIG. 9 is a diagram illustrating an example of a hardware implementation for an apparatus employing a UE with a voice/data hybrid mode system according to one aspect of the present disclosure.

FIG. 9 is a diagram illustrating an example of a hardware implementation for an apparatus 900 employing a voice data hybrid mode according to one aspect of the present disclosure. The voice/data hybrid mode system 914 may be implemented with a bus architecture, represented generally by a bus 924. The bus 924 may include any number of interconnecting buses and bridges depending on the specific application of the voice/data hybrid mode system 914 and the overall design constraints. The bus 924 links together various circuits including one or more processors and/or hardware modules, represented by a processor 926, a detecting module 902, an adaptive performing module 904, a sharing module 906, and a computer-readable medium 928. The bus 924 may also link various other circuits such as timing sources, peripherals, voltage regulators, and power management circuits, which are well known in the art, and therefore, will not be described any further.

The apparatus includes the voice/data hybrid mode system 914 coupled to a transceiver 922. The transceiver 922 is coupled to one or more antennas 920. The transceiver 922 provides a means for communicating with various other apparatus over a transmission medium. The voice/data hybrid mode system 914 includes the processor 926 coupled to the computer-readable medium 928. The processor 926 is responsible for general processing, including the execution of software stored on the computer-readable medium 928. The software, when executed by the processor 926, causes the voice/data hybrid mode system 914 to perform the various functions described supra for any particular apparatus. The computer-readable medium 928 may also be used for storing data that is manipulated by the processor 926 when executing software.

The voice/data hybrid mode system 914 further includes the detecting module 902 for detecting a first radio access technology (RAT) activity in response to a received first RAT suspend request for a second RAT tune-away. The system 914 also includes the adaptive performing module 904 for adaptively performing the first RAT suspend request according to a predetermined priority of the detected first RAT activity and a second RAT tune-away activity. The system 914 also has the sharing module 906 for sharing a first receive chain and a second receive chain between a first RAT modem and a second RAT modem. The detecting module 902, the adaptive performing module 904, and the sharing module may be software modules running in the processor 926, resident/stored in the computer-readable medium 928, one or more hardware modules coupled to the processor 926, or some combination thereof. The voice/data hybrid mode system 914 may be a component of the UE 650.

In one configuration, the apparatus 900 for wireless communication includes means for detecting and means for adaptively performing. The means may be the detecting module 902, the adaptive performing module 904 and/or the voice/data hybrid mode system 914 of the apparatus 900 configured to perform the functions recited by the detecting means and the adaptive performing means. In one aspect of the present disclosure, the detecting means may be the controller/processor 680 and/or memory 682 configured to perform the functions recited by the detecting means. In this aspect of the disclosure, the adaptive performing means may be the controller/processor 680 and/or memory 682 configured to perform the functions recited by the adaptive performing means. In this aspect of the disclosure, the sharing means may be the controller/processor 680 and/or memory 682, the first RX-1 processors 660-1, the second RX-2 processor 660-2, the transmit TX processor 670, and/or the first receiver 654-1 RX-1, and/or the second receiver 654-2 RX-2 configured to perform the functions recited by the sharing means. In another aspect, the aforementioned means may be any module or any apparatus configured to perform the functions recited by the aforementioned means.

The examples above describe aspects implemented in LTE and 1x systems. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication within a user equipment (UE), comprising:
    detecting an activity being performed by the UE using a first radio access technology (RAT) in response to a received first RAT suspend request for a second RAT tune-away, wherein a first receive chain and a second receive chain are shared between a first RAT modem of the UE and a second RAT modem of the UE;
    determining whether to delay the second RAT tune-away based at least in part on a predetermined priority of the detected activity, wherein the detected activity has priority over the second RAT tune-away when the second RAT tune-away is requested for a call originated at the UE, and the second RAT tune-away has priority over the detected activity when the second RAT tune-away is requested for a call terminating at the UE; and
    performing application flow control to save a current IP context of a first RAT application when the second RAT tune-away is performed.

2. The method of claim 1, further comprising:
    detecting a reduced data rate in response to performing the second RAT tune-away; and
    increasing a reported channel quality indicator (CQI) report by a predetermined amount until a predetermined data rate is detected.

3. The method of claim 1, further comprising:
    halting periodic measurements when performing the second RAT tune-away.

4. The method of claim 1, further comprising:
    blocking a notification of the second RAT tune-away to at least the first RAT application.

5. The method of claim 1, further comprising scheduling the second RAT tune-away in response to the received first RAT suspend request to reduce overlap with the detected activity of the first RAT.

6. The method of claim 1, in which the first RAT comprises long term evolution (LTE) and a second RAT comprises CDMA2000.

7. The method of claim 1, further comprising requesting an increased paging cycle duration for the first RAT prior to performing the second RAT tune-away.

8. An apparatus configured for wireless communication within a user equipment (UE), the apparatus comprising:
    a memory; and
    at least one processor coupled to the memory, the at least one processor being configured:
        to detect an activity being performed by the UE using a first radio access technology (RAT) in response to a received first RAT suspend request for a second RAT tune-away, wherein a first receive chain and a second receive chain are shared between a first RAT modem of the UE and a second RAT modem of the UE;

to determine whether to delay the second RAT tune-away based at least in part on a predetermined priority of the detected activity, wherein the detected activity has priority over the second RAT tune-away when the second RAT tune-away is requested for a call originated at the UE, and the second RAT tune-away has priority over the detected activity when the second RAT tune-away is requested for a call terminating at the UE; and to perform application flow control to save a current IP context of a first RAT application when the second RAT tune-away is performed.

9. The apparatus of claim 8, in which the processor is further configured to:

detect a reduced data rate in response to performing the second RAT tune-away; and increase a reported channel quality indicator (CQI) report by a predetermined amount until a predetermined data rate is detected.

10. The apparatus of claim 8, in which the processor is further configured to halt periodic measurements when performing the second RAT tune-away.

11. The apparatus of claim 8, in which the processor is further configured to block a notification of the second RAT tune-away to at least the first RAT application.

12. The apparatus of claim 8, in which the processor is further configured to schedule the second RAT tune-away in response to the received first RAT suspend request to reduce overlap with the detected activity of the first RAT.

13. The apparatus of claim 8, in which the first RAT comprises long term evolution (LTE) and a second RAT comprises CDMA2000.

14. The apparatus of claim 8, in which the at least one processor is further configured to request an increased paging cycle duration for the first RAT prior to performing the second RAT tune-away.

15. A non-transitory computer-readable medium having program code recorded thereon for wireless communication within a user equipment (UE), the program code comprising:

program code to detect an activity being performed by the UE using a first radio access technology (RAT) in response to a received first RAT suspend request for a second RAT tune-away, wherein a first receive chain and a second receive chain are shared between a first RAT modem of the UE and a second RAT modem of the UE;

program code to determine whether to delay the second RAT tune-away based at least in part on a predetermined priority of the detected activity, wherein the detected activity has priority over the second RAT tune-away when the second RAT tune-away is requested for a call originated at the UE, and the second RAT tune-away has priority over the detected activity when the second RAT tune-away is requested for a call terminating at the UE; and program code to perform application flow control to save a current IP context of a first RAT application when the second RAT tune-away is performed.

16. The computer program product of claim 15, in which the program code further comprises program code to request an increased paging cycle duration for the first RAT prior to performing the second RAT tune-away.

17. An apparatus for wireless communication within a user equipment (UE), comprising:

means for detecting an activity being performed by the UE using a first radio access technology (RAT) in response to a received first RAT suspend request for a second RAT tune-away, wherein a first receive chain and a second receive chain are shared between a first RAT modem of the UE and a second RAT modem of the UE;

means for determining whether to delay the second RAT tune-away based at least in part on a predetermined priority of the detected activity, wherein the detected activity has priority over the second RAT tune-away when the second RAT tune-away is requested for a call originated at the UE, and the second RAT tune-away has priority over the detected activity when the second RAT tune-away is requested for a call terminating at the UE; and means for performing application flow control to save a current IP context of a first RAT application when the second RAT tune-away is performed.

18. The apparatus of claim 17, further comprising means for requesting an increased paging cycle duration for the first RAT prior to performing the second RAT tune-away.

* * * * *